United States Patent [19]

Takano

[11] Patent Number: 4,626,227

[45] Date of Patent: Dec. 2, 1986

[54] SPRING-LOCKED VARIABLE SPEED PULLEY

[75] Inventor: Hiroshi Takano, Hyogo, Japan

[73] Assignee: Mitsuboshi Belting Ltd., Kobe, Japan

[21] Appl. No.: 794,877

[22] Filed: Nov. 4, 1985

[51] Int. Cl.⁴ .......................................... F16H 55/56
[52] U.S. Cl. .......................................... 474/8; 474/11
[58] Field of Search .................. 474/8, 11, 12, 17, 69, 474/22

[56] References Cited

U.S. PATENT DOCUMENTS

| 2,892,354 | 6/1959 | Amonsen | 474/8 X |
| 4,061,047 | 12/1977 | Newhouse | 474/8 X |
| 4,541,821 | 9/1985 | Sakakibara | 474/8 X |

Primary Examiner—Stephen J. Novosad
Assistant Examiner—Thuy M. Bui

Attorney, Agent, or Firm—Sughrue, Mion, Zinn, Macpeak and Seas

[57] ABSTRACT

A spring-locked variable speed pulley, such as may be used as a drive device for automotive, motorcycle or industrial applications, wherein the engagement of a spring with the side of a stopper and movable pulley piece are improved in such a manner that the pulley can be used in a wide variety of applications. The movable pulley piece is mounted on a shaft adjacent to a stationary pulley piece with the movable pulley being movable axially as well as being rotatable. A stopper and a spring are interposed between the movable and fixed pulley pieces. Pins protrude from the side of the confronting surfaces of the movable pulley piece and the stopper, which pins engage in holes formed in the ends of the spring, the holes being disposed diametrically opposite one another with respect to the center longitudinal axis of the spring.

3 Claims, 9 Drawing Figures

SPRING-LOCKED VARIABLE SPEED PULLEY

BACKGROUND OF THE INVENTION

The present invention relates to varaiable speed pulley, and more particularly to a spring-locked speed change pulley used as a drive device in an automobiles, motorcycle, agricultural machine, or other industrial machine.

Recently, a variety of varaiable speed pulleys of this type have been disclosed, for instance, in Japanese Published Utility Model Applications No. 35421/1977, Japanese Laid-Open Utility Model Application (Kokai) No. 122847/1984, and Japanese Laid-Open patent application (Kokai) No. 79355/1982. In these varaiable speed pulleys, a pair of V-shaped pulley pieces are mounted on a shaft in such a manner that either the two pulley pieces or only one pulley piece is rotatable around the shaft and movable along the shaft. A stopper is fixedly mounted on the shaft, located beside the one movable pulley piece or each of the two movable pulley pieces. A coil spring is interposed between the movable pulley piece and the adjacent stopper to absorb the torque which is developed during operation. With this arrangement, even under severe operating conditions, the variation in the effective diameter of the varaiable speed pulley employed as the drive or driven pulley and the belt tension established by a tension pulley or idler are automatically, effectively and positively adjusted.

In the varaiable speed pulley disclosed by Japanese Published Utility Model Application No. 35421/1977, as shown in FIG. 1 herein, the coil spring is wound in the direction that it is wound as the pulley rotates, the both ends of the spring are bent and engaged with holes formed in the movable pulley piece and a shaft cylinder provided on the side of the movable pulley piece. Accordingly, when the movable pulley piece is rotated repetitively in the forward and reverse directions by the variations of torque, the ends of the spring may be broken.

In the varaiable speed pulleys disclosed by Japanese Laid-Open patent application No. 79355/1982 and Japanese Published Utility Model Application No. 122847/1982, as shown in FIGS. 2 and 3 herein, respectively, both ends of the spring are abutted against engaging protrusions or fitted in tapered grooves. Therefore, in these variable speed pulleys, unlike the above-described ones, the ends of the spring will not be broken. However, because the spring is only unwound, it cannot transmit a torsional torque developed between the stopper and the movable pulley piece in the forward or reverse direction. Thus, that variable speed pulley suffers still from the difficulty that is very limited in its range of application.

SUMMARY OF THE INVENTION

In view of the foregoing, an object of the present invention is to provide an improved variable speed pulley which has a wide range of application. More specifically, an object of the present invention is to improve the way in which the spring is engaged with the sides of the stopper and the movable pulley piece so that the twisting torque which is developed between the stopper and the movable pulley piece in the forward or reverse direction can be effectively transmitted.

Specific features of the present invention reside in a variable speed pulley comprising a stationary pulley piece and a movable pulley piece wherein the movable pulley piece is mounted on a shaft on which the stationary pulley piece is fixedly mounted in such a manner that the movable pulley piece is rotatable around the shaft and movable along the shaft, a coil spring is interposed between the movable pulley piece and a stopper mounted on the shaft with the stopper being located on one side of the movable pulley piece, and holes formed in both ends of the coil spring are engaged with pins protruding from the sides of the movable pulley piece and stopper which confront one another.

In the operation of this variable speed pulley, a load caused by a belt laid around the pulley turning in either direction can be borne.

The coil spring may be circular in section, but it is also possible to use a coil spring of rectangular section because the ends of the spring where the holes are located can have a large effective spring height.

Since the holes in the ends of the coil spring are engaged with the pins protruding from the stopper and the movable pulley piece, in the case where the coil spring is turned in the opposite direction from which it is wound, the twisting torque developed between the movable pulley piece and the stopper is satisfactorily borne and transmitted, and in the case also where the coil spring is turned in the direction in which it is wound, the twisting torque is sufficiently borne and transmitted. Furthermore, as the coil spring has no bent parts, the coil spring will not be broken.

BRIEF DESCRIPTION OF THE DRAWINGS

FIGS. 1 through 3A and 3B are cross-sectional views of conventional speed charge pulleys;

DESCRIPTION OF THE PREFERRED EMBODIMENTS

An example of a variable speed pulley according to the invention will be described with reference to the accompanying drawing.

Figure 6A:
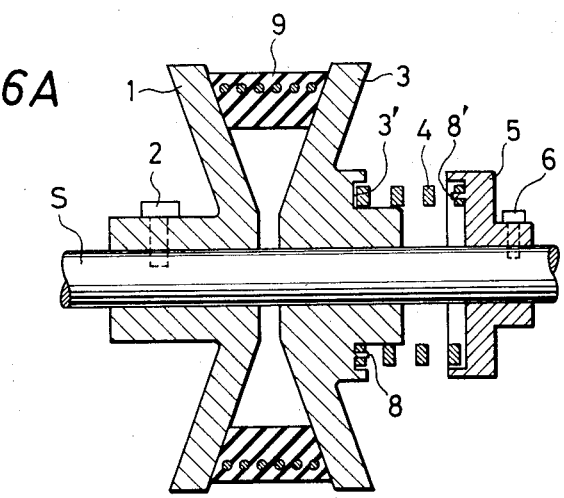
FIGS. 6A and 6B are cross-sectional views of two examples of variable speed pulleys according to the invention.

A variable speed pulley constructed according to the present invention is shown in FIGS. 6A. The speed change pulley shown in FIGS. 6A is in its ordinary state with a V-belt 9 laid therearound. In FIG. 6A, reference numeral 1 designates a stationary pulley piece which is fixedly mounted on a shaft S with a screw 2; and 3, a movable pulley piece mounted on the shaft confronting the stationary pulley piece 1. More specifically, the movable pulley piece 3 is mounted on the shaft S in such a manner that it is rotatable in the direction of rotation of the shaft, i.e., it is rotatable about the shaft, and it is movable in the direction of thrust, i.e., in the axial direction of the shaft.

An annular groove 3' is formed in the base of a boss protruding from the movable pulley piece 3. On the right-hand side of the movable pulley piece 3, a flange-shaped stopper 5 is fixedly mounted on the shaft S with a screw 6. A coil spring 4 is elastically interposed between the movable pulley piece 3 and the stopper 5 in such a manner that the ends of the spring 4 are held in the groove 3' and an annular recess 8 formed in the stopper 5. That is, the movable pulley 3 is urged in the axial direction by the coil spring.

Figure 1:
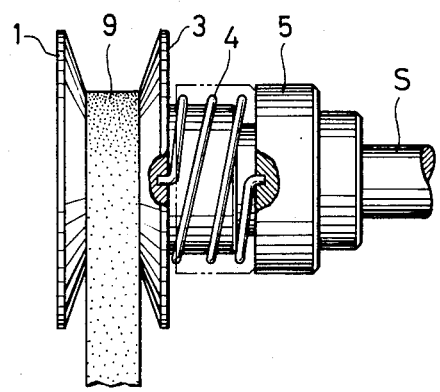
Figure 2A:
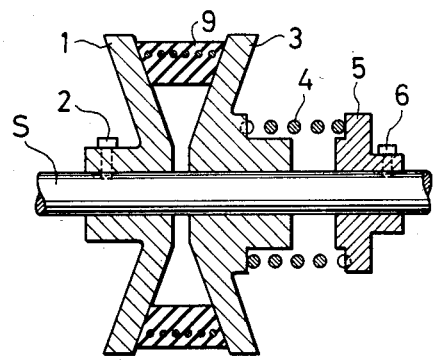
Figure 2B:
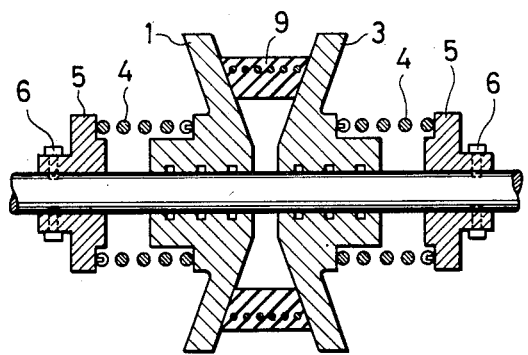
Figure 3A:
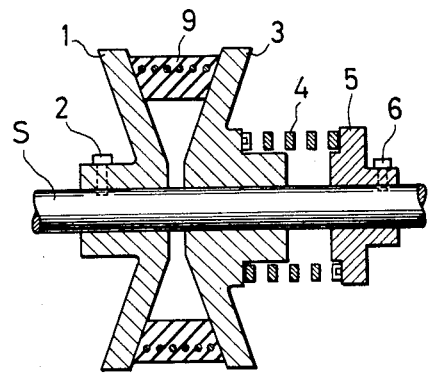
Figure 3B:
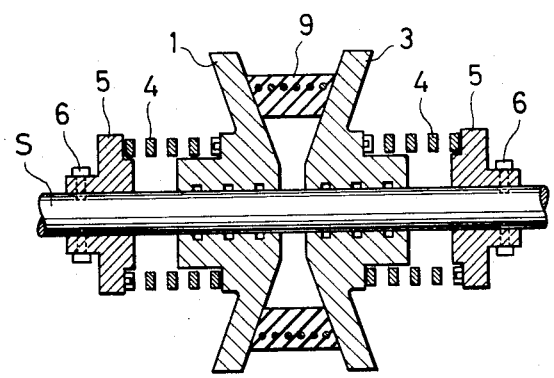
Figure 4:
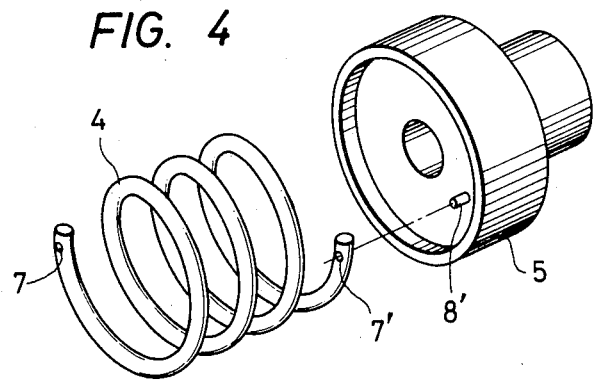
FIGS. 4 and 5 are perspective views showing essential components of variable speed pulleys of the invention.
Figure 5:
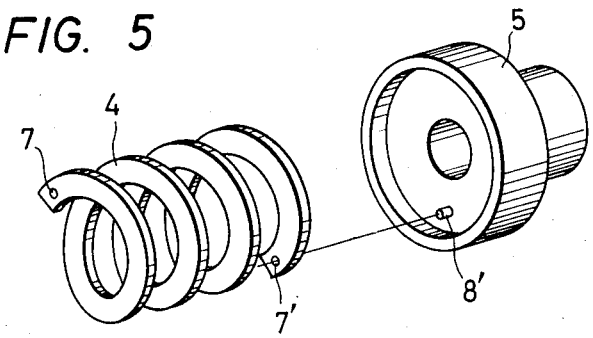

As shown in FIG. 5 in detail, holes 7 and 7' are formed in the ends of the spring 4. A pin 8 protrudes from the bottom of the annular groove 3', and similarly a pin 8' protrudes from the bottom of the annular recess in the stopper 5. These pins 8 and 8' are engaged with the holes 7 and 7', respectively, thereby to lock the spring 4. In this embodiment, the holes 7 and 7' are located 180° opposite one another around the center longitudinal axis of the spring 4.

The coil spring 4 may be circular in section; however, the coil spring 4 shown in the drawings is rectangular in section. Of the two types, for given values of spring constant, effective diameter and free length, a spring of rectangular cross section is preferred because of its greater twisting rigidity, i.e., smaller helix angle, and because it can withstand large loads.

Figure 6B:
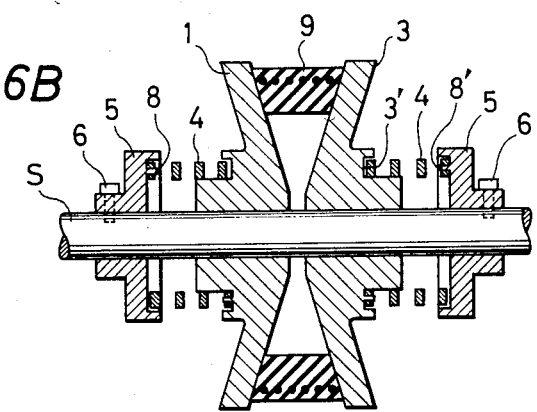

In the above-described example, one of the pulley pieces is stationary and the other is movable. However, the variable speed pulley may be modified so that both of the pulley pieces are movable and have respective stoppers, and two respective coil springs are interposed therebetween. Such an arrangement is shown in FIG. 6B.

The operation of the variable speed pulley thus constructed will be described.

When power is transmitted by the belt 9 laid in the V-groove formed by the two pulley pieces 1 and 3, torque occurs between the pulley pieces 1 and 3 in the forward or reverse direction. This torque is transmitted through the pin 8 protruding from the pulley piece 3 and the pin 8' provided on the stopper 5 to the latter, and through the bolt 6 to the shaft S. On the other hand, power can be transmitted from the shaft S to the belt 9. More specifically, the power can be transmitted from the shaft S through the stopper 5, the pin 8', the spring 4, the pin 8, and the movable pulley 8 to the belt 9 in the stated order.

As described above, in the variable speed pulley according to the invention, one of the pulley pieces forming the variable speed pulley is movable and rotatable around the shaft, and the coil spring is interposed between the movable pulley piece and the stopper by engaging the holes with the pins. Accordingly, the belt can be positioned in a balanced state due to the elastic force of the spring, and the effective diameter of the variable speed pulley can be readily changed by adjusting the belt tension.

Furthermore, in the inventive variable speed pulley, locking is effected by the pins protruding from the movable pulley piece and the stopper engaging with the holes in the ends of the coil spring, which locking action is effective both in the coil spring winding direction and in the coil spring unwinding direction, that is, for both directions of torque, i.e., for forward torque and reverse torque. Accordingly, the variable speed pulley according to the present invention can bear a load not only in the coil spring unwinding direction but also in the coil spring winding direction. Hence, the inventive speed change pulley has a wider range of use than the conventional pulley.

Still further, since the protruding pins are engaged with the holes in the ends of the coil spring, the latter has no bent part, and accordingly the coil spring, will not be broken when the twisting torque is transmitted through the coil spring in the forward or reverse direction thereof. Thus, the variable speed pulley of the invention can be effectively employed in a variety of industrial fields, increasing its range of application.

I claim:

1. A spring-locked variable speed pulley comprising: a stationary pulley piece fixedly mounted on a shaft; a movable pulley piece mounted on said shaft in such a manner that said movable pulley piece is movable in and axial direction of said shaft and is rotatable around said shaft; a stopper mounted on said shaft; a coil spring interposed between said movable pulley piece and said stopper with said stopper being on a side of said movable pulley piece opposite to the side of said movable pulley where said stationary pulley piece is provided; and a pin protruding from confronting sides of each of said movable pulley piece and said stopper, holes in both ends of said coil spring engaging with respective ones of said pins, wherein, in operation, when a load caused by a belt laid around said pulley rotates said coil spring in a direction in which it is wound or the direction opposite thereto, loads in respect torque directions are borne.

2. The spring-locked variable speed pulley as claimed in claim 1, in which said coil spring is rectangular in section.

3. The spring-locked variable speed pulley as claimed in claim 1, wherein said holes are located 180° opposite one another around a center longitudinal axis of said spring.

* * * * *